United States Patent
Colles et al.

(10) Patent No.: US 12,438,338 B2
(45) Date of Patent: Oct. 7, 2025

(54) AUTO FLUX TIMING FOR CURRENT RESONANT LASER DIODE DRIVER

(71) Applicant: Silanna Asia Pte Ltd, Singapore (SG)

(72) Inventors: Joseph H. Colles, Bonsall, CA (US); Steven E. Rosenbaum, San Diego, CA (US); Stuart B. Molin, Carlsbad, CA (US)

(73) Assignee: Silanna Asia Pte Ltd, Singapore (SG)

( * ) Notice: Subject to any disclaimer, the term of this patent is extended or adjusted under 35 U.S.C. 154(b) by 536 days.

(21) Appl. No.: 17/937,625

(22) Filed: Oct. 3, 2022

(65) Prior Publication Data
US 2024/0113502 A1    Apr. 4, 2024

(51) Int. Cl.
*H01S 5/042*   (2006.01)
*H01S 5/026*   (2006.01)
*H01S 5/062*   (2006.01)
*H01S 5/068*   (2006.01)
*H01S 5/40*    (2006.01)

(52) U.S. Cl.
CPC .......... *H01S 5/0428* (2013.01); *H01S 5/0261* (2013.01); *H01S 5/06216* (2013.01); *H01S 5/06808* (2013.01); *H01S 5/06825* (2013.01); *H01S 5/4025* (2013.01)

(58) Field of Classification Search
CPC .. H01S 5/0428; H01S 5/0261; H01S 5/06216; H01S 6/06808; H01S 5/06825; H01S 5/4025
See application file for complete search history.

(56) References Cited

U.S. PATENT DOCUMENTS

| | | |
|---|---|---|
| 3,944,854 A | 3/1976 | Keller |
| 5,895,984 A | 4/1999 | Renz |
| 9,300,113 B2 * | 3/2016 | Hoffman ............... H01S 5/0428 |
| 9,368,936 B1 | 6/2016 | Lenius et al. |
| 2003/0016711 A1 | 1/2003 | Crawford |
| 2004/0202216 A1 | 10/2004 | Fairgrieve |

(Continued)

FOREIGN PATENT DOCUMENTS

| | | |
|---|---|---|
| JP | 2016096221 A | 5/2016 |
| KR | 20150105889 A | 9/2015 |

OTHER PUBLICATIONS

International Search Report and Written Opinion dated Dec. 10, 2021 for PCT Patent Application No. PCT/IB2021/058143.

(Continued)

*Primary Examiner* — Jessica S Manno
(74) *Attorney, Agent, or Firm* — MLO, a professional corp.

(57) ABSTRACT

A pulsed laser diode driver includes a source capacitor that receives a refresh current at a first terminal and develops a source voltage therefrom. A first terminal of an inductor is connected to the first terminal of the source capacitor. A second terminal of the inductor is connected to an anode of a laser diode and a bypass capacitor. One or more switches are configured to control a current flow through the inductor. A timing and control circuit is configured to receive the source voltage and to generate one or more gate driver signals to control the switches to produce a high-current pulse through the laser diode. The high-current pulse corresponds to a peak current of a resonant waveform developed at the anode of the laser diode. A timing of the one or more gate driver signals is based on a voltage level of the source voltage.

18 Claims, 10 Drawing Sheets

(56) References Cited

U.S. PATENT DOCUMENTS

| | | |
|---|---|---|
| 2005/0185428 A1 | 8/2005 | Crawford et al. |
| 2005/0243879 A1 | 11/2005 | Horiuchi et al. |
| 2009/0161707 A1 | 6/2009 | Champion et al. |
| 2010/0283322 A1 | 11/2010 | Wibben |
| 2011/0291578 A1 | 12/2011 | Philippbar et al. |
| 2014/0009952 A1 | 1/2014 | Nomura et al. |
| 2014/0312233 A1* | 10/2014 | Mark .................. G01J 1/46 250/341.8 |
| 2016/0344156 A1 | 11/2016 | Rothberg et al. |
| 2017/0085057 A1 | 3/2017 | Barnes et al. |
| 2017/0223788 A1 | 8/2017 | Jämsä et al. |
| 2018/0261975 A1 | 9/2018 | Pavlov et al. |
| 2018/0278017 A1 | 9/2018 | Mignoli et al. |
| 2018/0323576 A1 | 11/2018 | Crawford et al. |
| 2019/0386460 A1 | 12/2019 | Barnes et al. |
| 2020/0067269 A1 | 2/2020 | Eggermont |
| 2020/0119518 A1 | 4/2020 | Crawford et al. |
| 2021/0066885 A1 | 3/2021 | Kuo et al. |
| 2022/0077651 A1 | 3/2022 | Colles et al. |
| 2022/0149588 A1 | 5/2022 | Colles et al. |
| 2024/0146023 A1* | 5/2024 | Colles .................. H01S 5/0428 |
| 2024/0213741 A1* | 6/2024 | Colles ................ H01S 5/06216 |

OTHER PUBLICATIONS

International Search Report and Written Opinion dated Jul. 19, 2021 for PCT Patent Application No. PCT/IB2021/052368.

Notice of Allowance and Fees dated Sep. 14, 2021 for U.S. Appl. No. 17/301,009.

International Search Report and Written Opinion dated Jan. 2, 2024 for PCT Patent Application No. PCT/IB2023/059636.

* cited by examiner

| | $M_{BP}$ | $M_{DL}$ | |
|---|---|---|---|
| Precharge$^n$ | OFF | OFF | ← 301 |
| Preflux$^n$ | ON | ON | ← 302 |
| Pulse Generation$^n$ | OFF | ON | ← 303 |
| Discharge$^n$ | ON | ON | ← 304 |
| Precharge$^{n+1}$ | OFF | OFF | ← 305 |

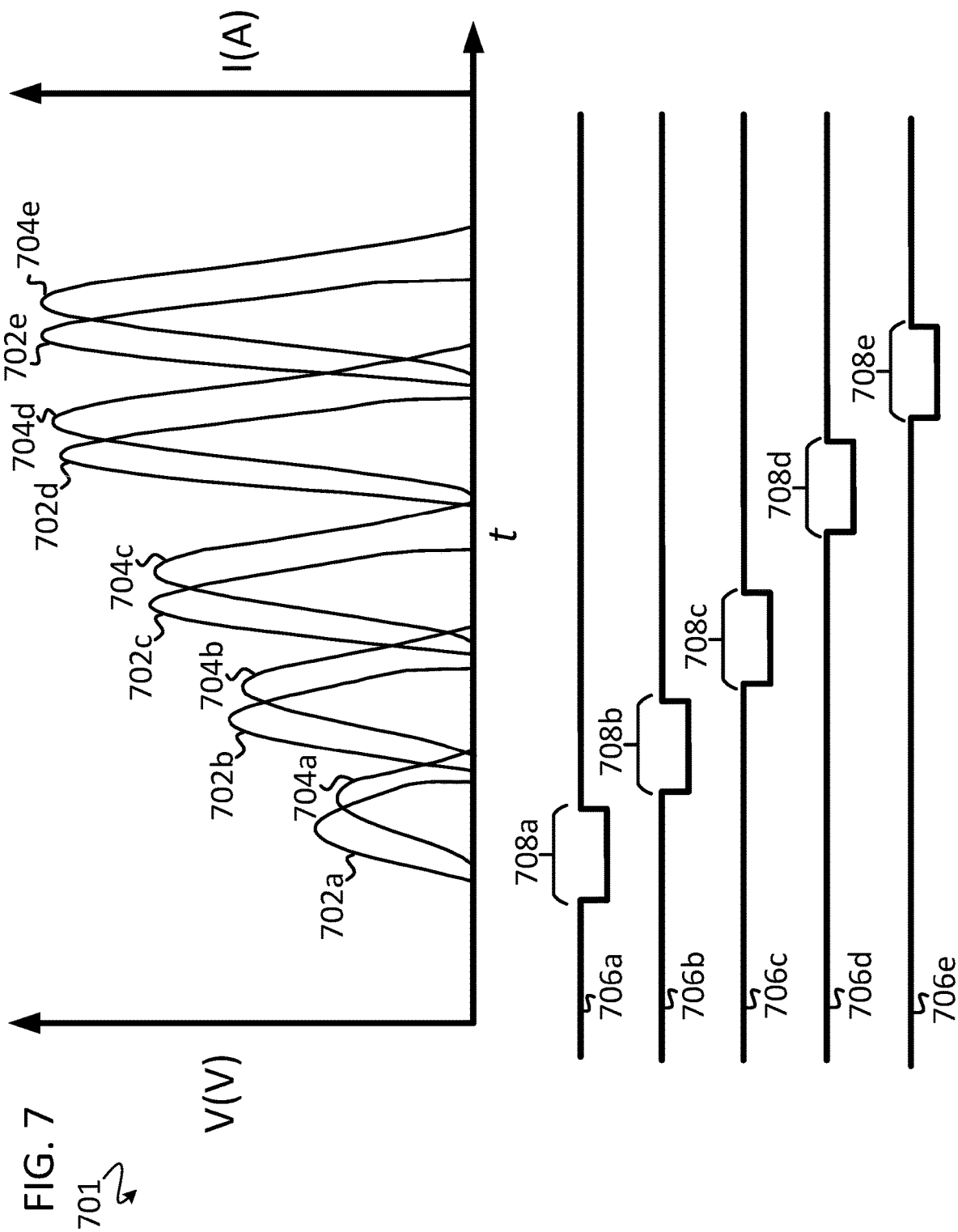

AUTO FLUX TIMING FOR CURRENT RESONANT LASER DIODE DRIVER

BACKGROUND

Laser-based ranging systems, such as Lidar, often use a pulsed laser diode driver circuit to generate a short high-current pulse which is passed through a laser diode to emit a corresponding pulse of laser light. Reflected pulses of laser light are received by the Lidar system and are used to determine a distance between the Lidar system and the point of reflection. The spatial resolution of a Lidar system is determined in part by the width of the pulse of laser light. Therefore, it is usually desirable to generate a pulse of light having a pulse width of about 5 ns or less.

Some pulsed laser driver circuits first develop a flux current through an inductor and then redirect the flux current through a laser diode as a high-current pulse, thereby resulting in light pulse emission. For maximum power efficiency, it is often desirable for the flux current through the inductor to be at a maximum amplitude when it is redirected through the laser diode. In some solutions, development of the flux current may be timed using a delay circuit to estimate a point in time when a maximum current amplitude through the inductor should occur, the point in time being around 25% of an inductive-capacitive (LC) resonant period of the laser driver circuit. However, in such solutions, a delay duration of the delay circuit must be adjusted if either or both of the inductive or capacitive components of the laser driver circuit are changed.

SUMMARY

In some embodiments, a pulsed laser diode driver includes a source capacitor having i) a first terminal configured to receive a refresh current and to develop a source voltage therefrom, and ii) a second terminal electrically coupled to ground. An inductor of the pulsed laser diode driver has a first terminal that is directly electrically connected to the first terminal of the source capacitor. A laser diode of the pulsed laser diode driver has an anode and a cathode, the anode being directly electrically connected to a second terminal of the inductor. A bypass capacitor of the pulsed laser diode driver has a first terminal directly electrically connected to the second terminal of the inductor. One or more switches of the pulsed laser diode driver are configured to control a current flow through the inductor. A timing and control circuit of the pulsed laser diode driver is configured to receive the source voltage and to generate one or more gate driver signals to control the one or more switches to produce a high-current pulse through the laser diode, the high-current pulse corresponding to a peak current of a resonant waveform developed at the anode of the laser diode, a timing of the one or more gate driver signals being based on a voltage level of the source voltage.

In some embodiments, a pulsed laser diode driver includes a source capacitor having i) a first terminal configured to receive a refresh current and to develop a source voltage therefrom, and ii) a second terminal electrically coupled to ground. An inductor of the pulsed laser diode driver has a first terminal that is directly electrically connected to the first terminal of the source capacitor. A laser diode of the pulsed laser diode driver has an anode and a cathode, the anode being directly electrically connected to a second terminal of the inductor. A bypass capacitor of the pulsed laser diode driver has a first terminal directly electrically connected to the second terminal of the inductor. A bypass switch of the pulsed laser diode driver has a drain node that is directly electrically connected to the second terminal of the inductor and a source node that is directly electrically connected to ground, the bypass switch being configured to control a current flow through the inductor. A timing and control circuit of the pulsed laser diode driver is configured to receive the source voltage, and based on determining that a voltage level of the source voltage is less than a threshold voltage, to disable the bypass switch to produce a high-current pulse through the laser diode, the high-current pulse corresponding to a peak current of a resonant waveform developed at the anode of the laser diode.

BRIEF DESCRIPTION OF THE DRAWINGS

FIG. 7 shows simplified plots of signals related to operation of the pulsed laser diode driver shown in FIG. 4, in accordance with some embodiments.

DETAILED DESCRIPTION

Figure 1:
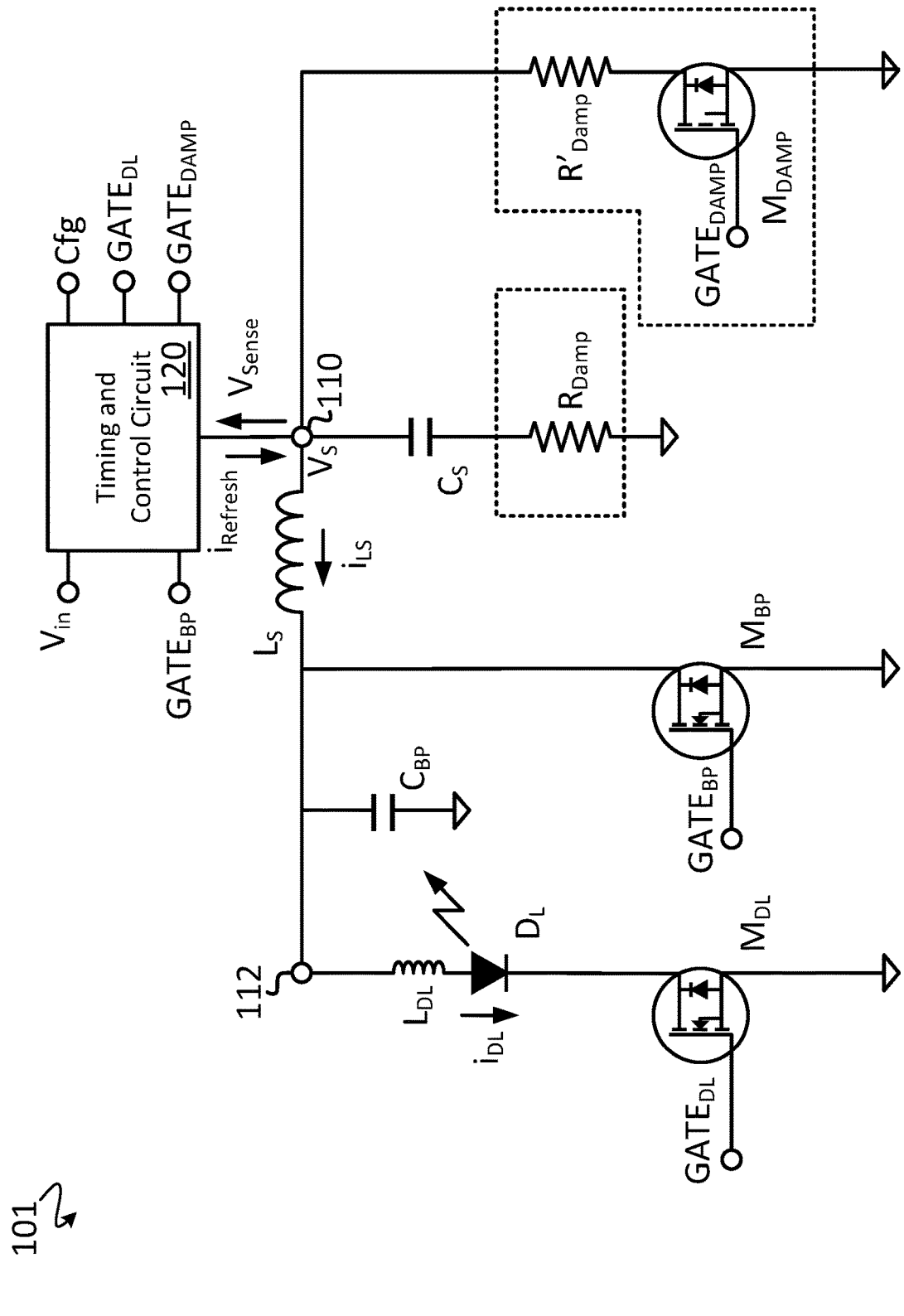
FIG. 1 is a simplified circuit schematic of pulsed laser diode driver of a first general topology with adaptive switch timing, in accordance with some embodiments.

Laser-based ranging systems, such as Lidar systems, often use a pulsed laser diode driver circuit to generate a short (e.g., 1-5 ns), high-current (e.g., 40 Amp) pulse which is passed through a laser diode to emit a corresponding pulse of laser light. Some pulsed laser driver circuits first develop a flux current through an inductor and then change a switch state to redirect the current from the inductor along a second current path to produce a high-current pulse through a laser diode, thereby resulting in light pulse emission. For maximum power efficiency, it is often desirable for the flux current through the inductor to be at a maximum amplitude when it is redirected through the laser diode.

The adaptive switch timing circuit disclosed herein is operable to adaptively determine when a maximum flux current has been developed through an inductor of a pulsed laser diode driver and to automatically and adaptively produce an optimal switch timing for producing short high-current pulses through one or more laser diodes. Switch timing in this context means a point in time at which a switch of a pulsed laser diode driver changes state such that a current developed through an inductor of the pulsed laser diode driver is redirected such that it passes through one or more laser diodes.

The pulsed laser diode drivers disclosed herein generate high-current ultra-short pulses using a tunable resonant circuit, as compared to conventional solutions that rely on fixed, and often unavoidable, parasitic capacitances and inductances of a circuit. The tunable resonant circuit provides easily tunable parameters which control a pulse width, a peak current, a charge time, a recovery time, a decay time, and other tunable parameters of the pulsed laser diode driver. Embodiments of a switching sequence to drive the pulsed laser diode drivers disclosed herein are operable to generate a resonant waveform at an anode of the laser diode to produce the high-current pulse through the laser diode, a voltage level of the resonant waveform being advantageously sufficient to support the high-current pulse and not of a voltage level that exceeds the voltage required to generate the high-current pulse.

Embodiments of such pulsed laser diode drivers can advantageously generate the high-current pulses using a low input voltage (e.g., 6 V, 9 V, 15 V, etc.) and can thereby use Silicon-based switches, rather than GaN-based switches which are used by many conventional solutions. Any of the pulsed laser diode drivers disclosed herein can therefore be integrated into a single semiconductor die. Embodiments of pulsed laser diode drivers disclosed herein advantageously use a discrete inductor (e.g., a through-hole or surface-mounted component) intentionally added to the pulsed laser diode driver to generate a resonant waveform rather than relying on parasitic inductances (e.g., of the laser diode, of bond wires, or inter-circuit connections) of the pulsed laser diode driver. As a result, embodiments of the laser drivers disclosed herein are easily tunable and have a reproducible architecture. By contrast, conventional pulsed laser diode drivers often use a variety of techniques to overcome the effects of parasitic inductances of the pulsed laser diode driver and of the laser diode itself and therefore teach away from intentionally adding yet additional inductance to the pulsed laser diode driver. In addition to such intentionally added inductors, the pulsed laser diode drivers disclosed herein advantageously include a bypass capacitor that may be used by a designer to easily tune a desired pulse width emitted by the laser diode, as compared to conventional solutions which only have an energy storage capacitor, or that only consider non-tunable parasitic capacitances of the pulsed laser diode driver. Once again, such conventional solutions teach away from adding yet additional capacitance to the pulsed laser diode driver.

Because conventional solutions rely on parasitic capacitances and inductances of the conventional laser driver, modifying parameters such as a pulse width might require a redesign or re-layout of the conventional solution. By comparison, parameters, such as a pulse width, of the pulsed laser diode drivers disclosed herein can be tuned by simply changing a component value.

FIG. 1 is a simplified circuit schematic of a pulsed laser diode driver 101 of a first general topology to drive a laser diode using a low-side switch, in accordance with some embodiments. The pulsed laser diode driver 101 generally includes an energy storage capacitor "source capacitor" $C_S$ (i.e., a physical component that is not representative of a parasitic capacitance of another component), an optional damping resistor $R_{Damp}$, an alternate optional damping resistor $R'_{Damp}$, an inductor $L_S$ (i.e., a physical component that is not representative of a parasitic inductance of another component), a bypass capacitor $C_{BP}$ (i.e., a physical component that is not representative of a parasitic capacitance of another component), a laser diode $D_L$, a bypass switch $M_{BP}$, a laser diode switch $M_{DL}$, and an optional discharge switch $M_{DAMP}$. The laser diode switch $M_{DL}$ is configured as a low-side switch. Also shown is a timing and control circuit 120 which implements adaptive switch timing, nodes 110, 112, a refresh current $i_{Refresh}$, a voltage sense signal $V_{Sense}$, a parasitic inductance $L_{DL}$ of the laser diode $D_L$, a DC input voltage $V_{in}$, a source voltage $V_S$ at the source capacitor $C_S$, a fluxing current $i_{LS}$ through the inductor $L_S$, a current $i_{DL}$ through the laser diode $D_L$, a bypass switch gate driver signal $GATE_{BP}$, a laser diode switch gate driver signal $GATE_{DL}$, configuration data CFG, and a discharge switch gate driver signal $GATE_{DAMP}$.

As shown in FIG. 1, in some embodiments, the pulsed laser diode drivers disclosed herein include the alternate optional damping resistor $R'_{Damp}$ and the optional discharge switch $M_{DAMP}$ which are connected in parallel to the source capacitor $C_S$ thereof to rapidly discharge the source capacitor $C_S$ when the discharge switch $M_{DAMP}$ is enabled via the discharge switch gate driver signal $GATE_{DAMP}$. In such embodiments, the damping resistor $R_{Damp}$ may advantageously be excluded, and the source capacitor $C_S$ is instead connected directly to ground instead of being coupled to ground through the damping resistor $R_{Damp}$. Similarly, in embodiments in which the damping resistor $R_{Damp}$ is included, the alternate optional damping resistor $R'_{Damp}$ and the optional discharge switch $M_{DAMP}$ may be excluded.

The timing and control circuit 120 controls a current amplitude of the refresh current $i_{Refresh}$ in response to a charge level (i.e., the source voltage $V_S$) of the source capacitor $C_S$. The amplitude of the refresh current $i_{Refresh}$ in turn controls how quickly or slowly the source capacitor $C_S$ is charged, or "refreshed". While it is desirable that the source capacitor $C_S$ be charged as quickly as possible, such rapid charging may result in undesirable voltage overshoot at the source capacitor $C_S$. Thus, one role of the timing and control circuit 120 is to optimize a charge rate of the source capacitor $C_S$ while at the same time preventing voltage overshoot. The timing and control circuit 120 is additionally operable to control signal timing for switch gate driver signals $GATE_{DL}$, $GATE_{BP}$, and $GATE_{DAMP}$. Charge rate optimization for the source capacitor $C_S$ is described in detail in U.S. patent application Ser. No. 17/653,349, filed on Mar. 3, 2022, and all of which is incorporated herein by reference in its entirety.

As disclosed herein, signal timing for the switch gate driver signals $GATE_{DL}$, $GATE_{BP}$, and $GATE_{DAMP}$ is advantageously controlled by the timing and control circuit 120 such that the current $i_{LS}$ through the inductor $L_S$ is not directed through the laser diode $D_L$ until the current $i_{LS}$ is at a maximum amplitude ("a maximum flux current amplitude"). The timing and control circuit 120 adaptively adjusts the switch gate driver signal timing as values of the inductive and/or capacitive components of the pulsed laser diode driver 101 change. Such changes include intentional changes (e.g., by a designer or end-user), and/or unintentional changes (e.g., parametric changes in component values through the operating life of a circuit or due to temperature changes). As described below, the timing and control circuit 120 is operable to adaptively adjust the switch gate driver signal timing to achieve a maximum flux current amplitude by monitoring and reacting to an amplitude of the voltage $V_S$ developed at node 110 of the source capacitor $C_S$.

To elaborate, the inductor $L_S$ and the capacitor $C_S$ form respective inductive and capacitive components of an inductive-capacitive (LC) circuit of the pulsed laser diode driver 101. As is well understood in the art, there is a 90-degree phase shift between a voltage developed at a capacitor of such LC circuits and a current through an inductor thereof. Thus, when the voltage $V_S$ at the source capacitor $C_S$ is at a minimum voltage amplitude, a current $i_{LS}$ through the inductor $L_S$ is at a maximum current amplitude. By detecting the occurrence of a voltage minimum of the source voltage $V_S$ at the source capacitor $C_S$, the timing and control circuit 120 advantageously redirects the current $i_{LS}$ through the laser diode $D_L$ when the current $i_{LS}$ is close to a maximum current amplitude.

Topologies of the pulsed laser diode driver 101 vary with respect to the placement of the bypass capacitor $C_{BP}$. In each topology of the pulsed laser diode driver 101, the timing and control circuit 120 is configured to be directly electrically connected to the DC input voltage $V_{in}$. The DC input voltage $V_{in}$ may be a fixed voltage from a fixed voltage source or may be a voltage from a variable voltage source, such as from a digital-to-analog converter (DAC) (not shown). A voltage level of the DC input voltage $V_{in}$ may be set by the fixed or variable voltage source in accordance with a desired amplitude of a laser pulse emitted by the respective pulsed laser diode driver.

In some topologies of the pulsed laser diode driver 101, a first terminal of the source capacitor $C_S$ is directly electrically connected to the timing and control circuit 120, and a second terminal of the source capacitor $C_S$ is directly electrically connected to a first terminal of the damping resistor $R_{Damp}$. A second terminal of the damping resistor $R_{Damp}$ is directly electrically connected to a bias voltage node such as ground. Thus, the second terminal of the source capacitor $C_S$ is electrically coupled to the bias voltage node. A first terminal of the inductor $L_S$ is directly electrically connected to the timing and control circuit 120 and to the first terminal of the source capacitor $C_S$. The refresh current $i_{Refresh}$ flows from the timing and control circuit 120 to the source capacitor $C_S$ to develop the source voltage $V_S$ at the source capacitor $C_S$. A drain node of the bypass switch $M_{BP}$ is directly electrically connected to a second terminal of the inductor $L_S$, and a source node of the bypass switch $M_{BP}$ is directly electrically connected to the bias voltage node. An anode of the laser diode $D_L$ is directly electrically connected to the second terminal of the inductor $L_S$, and a cathode of the laser diode $D_L$ is directly electrically connected to a drain node of the laser diode switch $M_{DL}$. A source node of the laser diode switch $M_{DL}$ is directly electrically connected to the bias voltage node.

The bypass switch $M_{BP}$ is configured to receive the bypass switch gate driver signal $GATE_{BP}$ at a gate node, the bypass switch gate driver signal $GATE_{BP}$ being operable to turn the bypass switch $M_{BP}$ on or off based on a voltage level of the bypass switch gate driver signal $GATE_{BP}$. Similarly, the laser diode switch $M_{DL}$ is configured to receive the laser diode switch gate driver signal $GATE_{DL}$ at a gate node, the laser diode switch gate driver signal $GATE_{DL}$ being operable to turn the laser diode switch $M_{DL}$ on or off based on a voltage level of the laser diode switch gate driver signal $GATE_{DL}$. In some embodiments, the pulsed laser diode driver circuits disclosed herein include one or more bootstrap circuits or other level-shifting circuits to drive one or more high-side switches. Either or both of the bypass switch $M_{BP}$ and the laser diode switch $M_{DL}$ can be implemented as N-type switches or P-type switches. In some embodiments, the bypass switch $M_{BP}$ and the laser diode switch $M_{DL}$ are implemented as Silicon-based or Silicon-Carbide-based field-effect transistors (FETs). Two or more components described herein as having terminals that are directly electrically connected have a DC current path between the respective terminals of the two or more components. For example, a first and second component are not directly electrically connected via a capacitor or inductor connected in series between the first component and the second component.

As shown in the simplified circuit schematic of the pulsed laser diode driver 101 of FIG. 1, in some embodiments a first terminal of the bypass capacitor $C_{BP}$ is directly electrically connected to the second terminal of the inductor $L_S$ and to the anode of the laser diode $D_L$. In such embodiments, a second terminal of the bypass capacitor $C_{BP}$ is directly electrically connected to the bias voltage node. In other embodiments (not shown), the first terminal of the bypass capacitor $C_{BP}$ is directly electrically connected to the second terminal of the inductor $L_S$ and to the anode of the laser diode $D_L$. The second terminal of the bypass capacitor $C_{BP}$ is directly electrically connected to the second terminal of the source capacitor $C_S$. In yet other embodiments (not shown), the first terminal of the bypass capacitor $C_{BP}$ is directly electrically connected to the second terminal of the inductor $L_S$ and to the anode of the laser diode $D_L$. In such embodiments, the second terminal of the bypass capacitor $C_{BP}$ is directly electrically connected to the drain terminal of the laser diode switch $M_{DL}$ and to the cathode of the laser diode $D_L$.

In some embodiments, the pulsed laser diode driver 101 is configured to receive the DC input voltage $V_{in}$ having a voltage range from about 10 V to 20 V, which is advantageously lower than an input voltage used by many conventional pulsed laser diode drivers. The inductor $L_S$ is a physical component added to the pulsed laser diode driver 101 (i.e., as opposed to a representation of a parasitic inductance caused by components or interconnections such as bond wires). Similarly, the bypass capacitor $C_{BP}$ is a physical component added to the pulsed laser diode driver 101 (i.e., as opposed to a representation of a parasitic capacitance). One advantage of using physical inductor and capacitor components rather than using parasitic inductances is that values of the inductor $L_S$ and the bypass capacitor $C_{BP}$ can be easily modified by a designer or even an end-user. By comparison, conventional designs that rely on parasitic reactances may require re-design and/or re-layout to change an operating parameter.

For some applications, the amplitude of a high-current pulse delivered by a resonant circuit such as any of those disclosed herein may need to be adjusted in amplitude from pulse-to-pulse. Thus, in some embodiments, either of the pulsed laser drivers 101/401 disclosed herein are advantageously operable to configure an amplitude of the high-current pulse delivered to one or more laser diodes on a pulse-to-pulse basis. In such embodiment, the DC input voltage $V_{in}$ is advantageously provided by an adjustable voltage supply (i.e., a digital-to-analog converter (DAC)) (not shown). In some embodiments, an output voltage level of the adjustable voltage supply is set using the timing and control circuit 120. Use of an adjustable voltage supply, such as a DAC, to provide the DC input voltage $V_{in}$ to the pulsed laser diode driver circuits disclosed herein is possible because of the advantageously low input voltage requirements for such embodiments. In some embodiments, the adjustable voltage supply is controlled such that the adjustable voltage supply charges the source capacitor $C_S$ described herein only during a first portion of a switching cycle. As such, the value of the DC input voltage $V_{in}$ and a current amplitude of the high-current pulse delivered to the laser diode(s) disclosed herein may be advantageously varied between consecutive high-current pulses through the laser diode(s).

As disclosed herein, values of the DC input voltage $V_{in}$, the inductance of the inductor $L_S$, the capacitance of the source capacitor $C_S$, the resistance of the damping resistor $R_{Damp}$ or the alternate optional damping resistor $R'_{Damp}$ (if used), and the capacitance of the bypass capacitor $C_{BP}$ can advantageously be selected ("tuned") to achieve a desired operation of the pulsed laser diode driver 101 (e.g., a charge time, a pulse width, a pulse voltage, a pulse current). For example, a pulse width of the current $i_{DL}$ flowing through the laser diode $D_L$ can be tuned by adjusting the capacitance value of the bypass capacitor $C_{BP}$. A peak current level of the pulse of current $i_{DL}$ flowing through the laser diode $D_L$ can be tuned by adjusting the source voltage $V_S$ on the source capacitor $C_S$. A capacitance value of the source capacitor $C_S$ can be tuned to adjust a timing delay of the current pulse and an upper range of the current $i_{DL}$ through the laser diode $D_L$. Resistance values of the damping resistor $R_{Damp}$ and the alternate optional damping resistor $R'_{Damp}$, if used, are dependent on the capacitance value of the source capacitor $C_S$ and can be tuned within a range of values such that at a lower resistance, a lower frequency resonance of the pulsed laser diode drivers disclosed herein is underdamped (e.g., at about $R_{Damp}=0.1$ Ohm), or is critically damped (e.g., at about $R_{Damp}=0.4$ Ohm). When the source capacitor $C_S$ is in series with the optional damping resistor $R_{Damp}$, a series RLC circuit is formed and a value of the damping resistor R Damp selected by a designer to critically damp the circuit should be calculated accordingly. By comparison, when the alternate optional damping resistor $R'_{Damp}$ is in series with the discharge switch $M_{DAMP}$ and the discharge switch $M_{DAMP}$ is enabled, a parallel RLC circuit is formed and a value of the alternate optional damping resistor $R'_{Damp}$ selected by a designer to critically damp the circuit should be calculated accordingly. The optional damping resistor $R_{Damp}$ and the alternate optional damping resistor $R'_{Damp}$ are separately operable to prevent current of the generated resonant waveform from becoming negative which could thereby enable a body diode of the bypass switch $M_{BP}$ or the laser diode switch $M_{DL}$. Although a resulting maximum current level of the current $i_{DL}$ through the laser diode $D_L$ is lower for the critically damped case, the current level can be easily adjusted by raising the voltage level of the DC input voltage $V_{in}$. In other embodiments, the damping resistor $R_{Damp}$ is removed entirely from the design (i.e., the second terminal of the source capacitor $C_S$ is directly electrically connected to the bias voltage node). In yet other embodiments, the resistance value of the damping resistor $R_{Damp}$ is set to zero Ohms. As disclosed herein, as such values are adjusted, or tuned, the timing and control circuit 120 is advantageously operable to adjust a timing of gate control signals of the pulsed resonant laser diode driver circuits disclosed herein such that current through the inductor $L_S$ is directed through a laser diode when the inductor current is at a maximum amplitude.

In some embodiments, the DC input voltage $V_{in}$ is about 15 V, the inductance of the inductor $L_S$ is about 6 nH, the capacitance of the source capacitor $C_S$ is about 100 nF, the resistance of the damping resistor $R_{Damp}$ is about 0.1 Ohms, and the capacitance of the bypass capacitor $C_{BP}$ is about 1 nF. In some embodiments, a voltage at the first terminal of the damping resistor $R_{Damp}$ is received by the timing and control circuit 120 to provide an indication of a current flow through the damping resistor $R_{Damp}$.

In some or all of the embodiments disclosed herein, to produce around a 40-A high-current pulse through the laser diode (or laser diodes) $D_L$, the DC input voltage $V_{in}$ may range from 10-15 volts. In some such embodiments, the inductance of inductor $L_S$ may range from 5-10 nH, the value of which determines the amount of flux delay to produce the required current. In some such embodiments, the inductance of the inductor $L_S$ is selected to be an order of magnitude greater than a parasitic inductance of a printed circuit board (PCB) in which the pulsed laser diode driver is implemented. In some embodiments, the resistance of the damping resistor $R_S$ ranges from 100-200 mOhms. A capacitance of the bypass capacitor $C_{BP}$ determines the pulse width of the high-current pulse through the laser diode(s) $D_L$, and in some embodiments ranges in capacitance from 1-5 nF. In some such embodiments, a capacitance of the source capacitor $C_S$ ranges from 25-100 nF depending on a peak current of the high-current pulse through the laser diode(s) $D_L$ that is required or desired. The smaller the source capacitor $C_S$, the higher the DC input voltage $V_{in}$ is needed to get the required or desired peak current of the high-current pulse through the laser diode(s) $D_L$. In some such embodiments, a smallest capacitance value of the source capacitor $C_S$ that can still deliver the needed or desired peak current of the high-current pulse through the laser diode(s) D L is selected because all the remaining energy after the high-current pulse is shunted to ground and is wasted, thereby lowering a power efficiency of the pulsed laser diode driver.

Figure 2A:
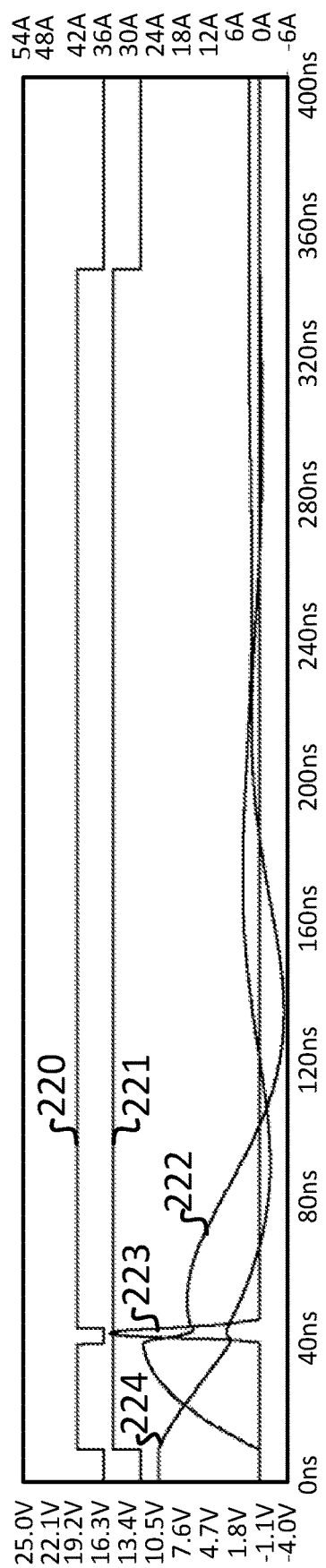
FIGS. 2A-2D show simplified plots of signals related to operation of the pulsed laser diode driver shown in FIG. 1, in accordance with some embodiments.
Figure 2A:
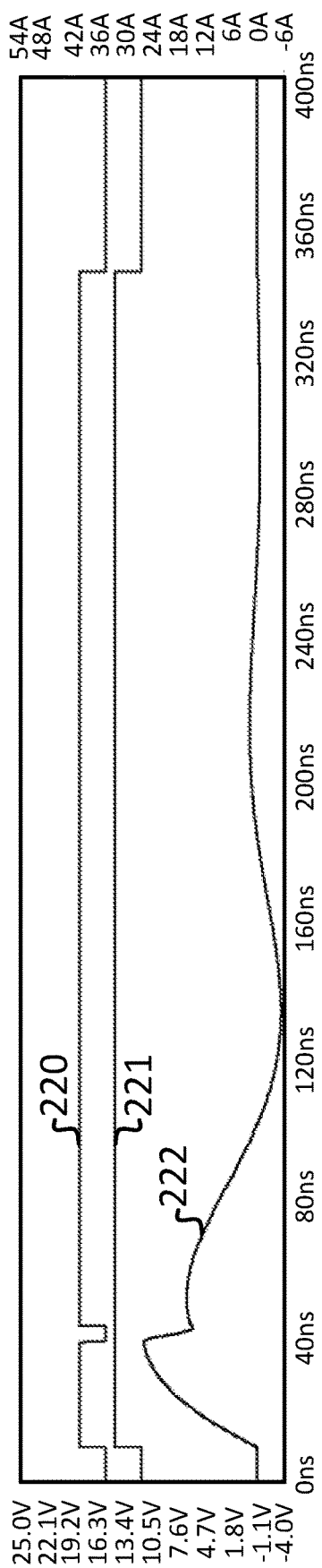
Figure 2B:
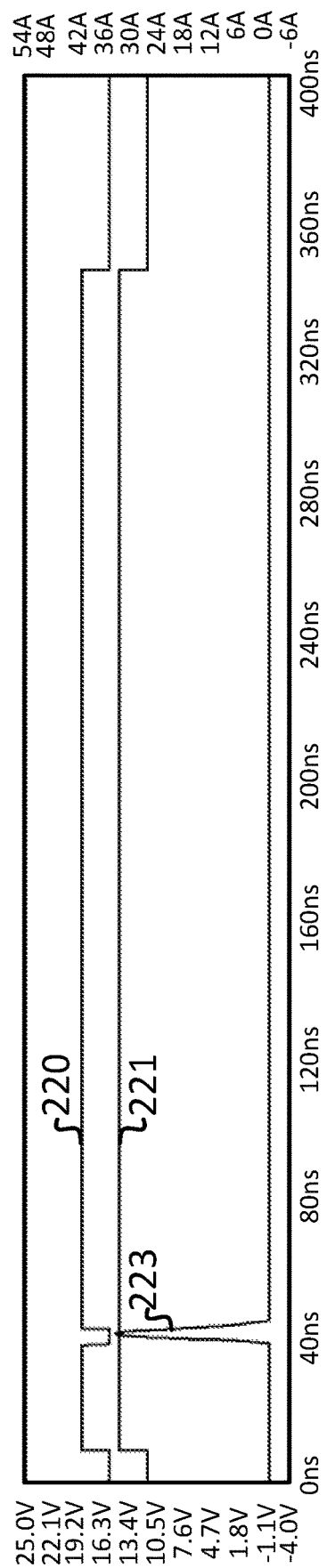
Figure 2B:
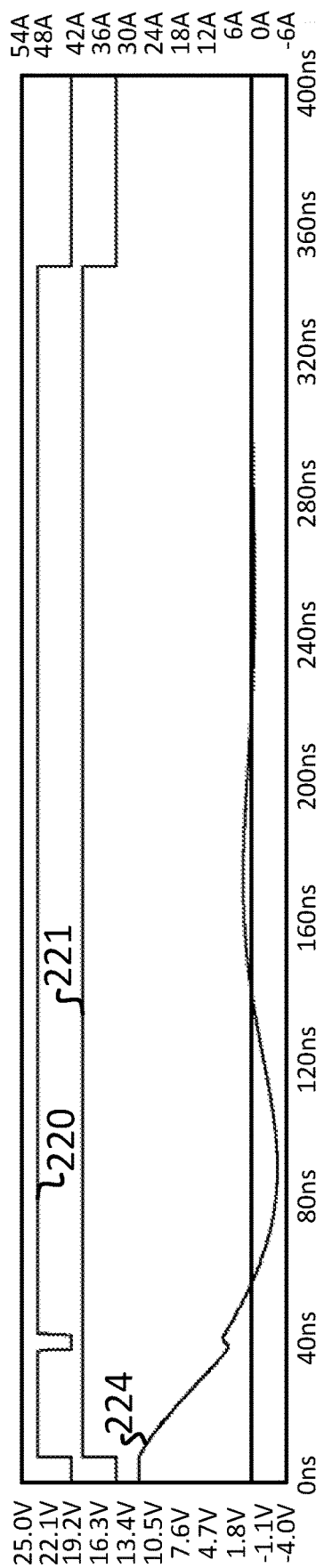
Figure 2C:
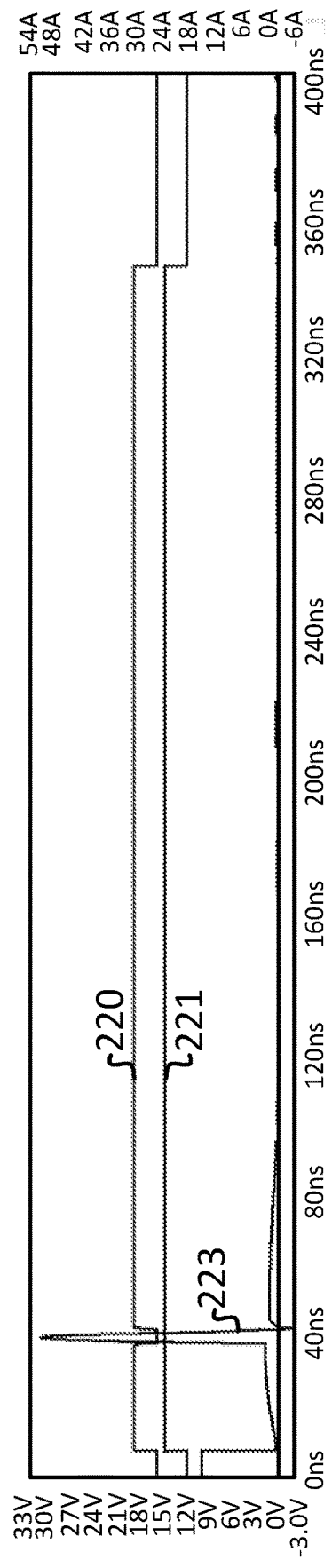
Figure 2C:
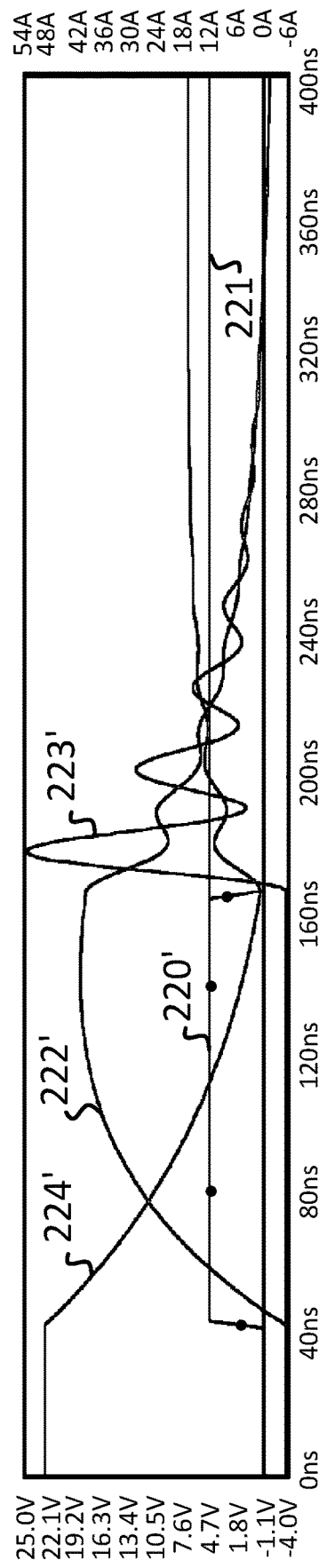
Figure 2D:
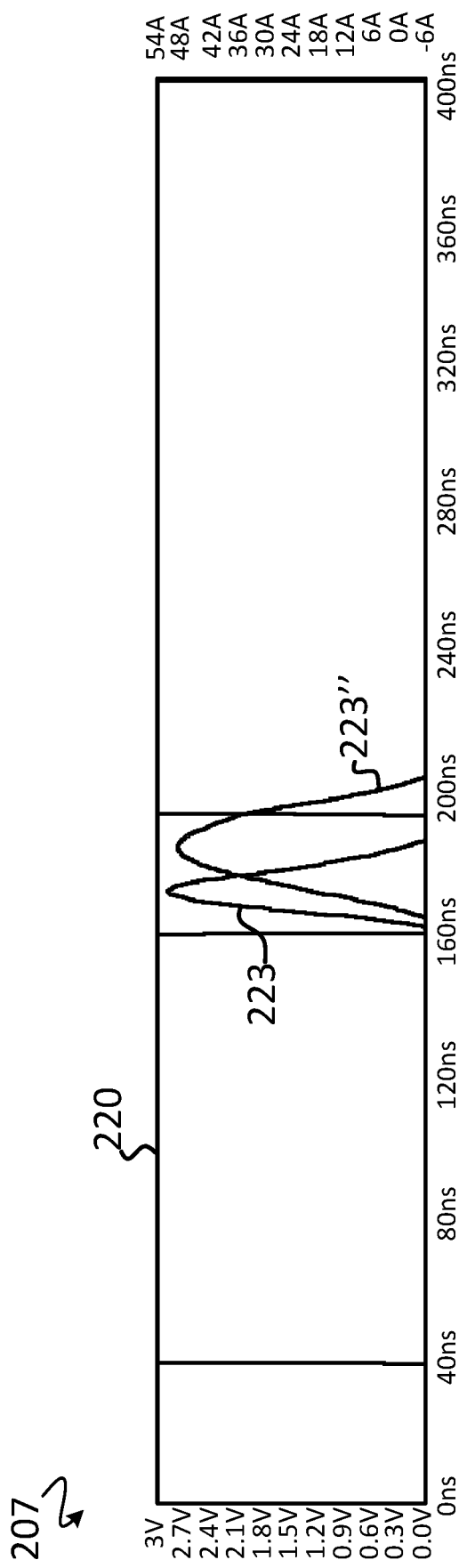
Figure 3:
FIG. 3 is a portion of an example switching sequence for operation of the pulsed laser diode driver shown in FIG. 1, in accordance with some embodiments.

The timing and control circuit 120 may be integrated with any embodiment of the pulsed laser diode drivers disclosed herein, or it may be a circuit or module that is external to any embodiment of the pulsed laser diode drivers disclosed herein. The timing and control circuit 120 is operable to generate one or more gate drive signals having a voltage level that is sufficient to control (i.e., change the state of) the laser diode switch $M_{DL}$, the discharge switch $M_{DAMP}$, and the bypass switch $M_{BP}$. Additionally, the timing and control circuit 120 is operable to sense a voltage and/or current at any of the nodes 110 and 112 and at nodes that are similar to, or the same as, the nodes 110 and 112 as described herein, or at still other nodes of the pulsed laser diode drivers disclosed herein. The timing and control circuit 120 may include one or more timing circuits, look-up tables, processors, memory, or other modules to control the pulsed laser diode drivers disclosed herein. Operation of the pulsed laser diode driver 101 is explained in detail with respect to simplified plots 201-207 of FIGS. 2A-D and an example switching sequence 300 is shown in FIG. 3.

FIGS. 2A-2D show simplified plots 201-207 of signals related to operation of the pulsed laser diode driver 101 shown in FIG. 1, in accordance with some embodiments. However, signals related to the operation of the other pulsed laser diode drivers disclosed herein are similar to, or are the same as, those shown in the simplified plots 201-207.

The simplified plot 201 illustrates a voltage plot of the bypass switch gate driver signal $GATE_{BP}$ 220, a voltage plot of the laser diode switch gate driver signal $GATE_{DL}$ 221, a current plot of the current $i_{LS}$ through the inductor $L_S$ 222, a current plot of the current $i_{DL}$ through the laser diode $D_L$ 223, and a voltage plot of the source voltage $V_S$ 224 at the source capacitor $C_S$, all over the same duration of time. Details of these signals are described below. The voltage plots of the bypass switch gate driver signal $GATE_{BP}$ 220 and the laser diode switch gate driver signal $GATE_{DL}$ 221 have been level-shifted for readability, but are, in actuality, low voltage inputs. Additionally, the voltage plots of the bypass switch gate driver signal $GATE_{BP}$ 220 and the laser diode switch gate driver signal $GATE_{DL}$ 221 assume that the laser diode switch $M_{DL}$ and the bypass switch $M_{BP}$ are N-type FET devices. However, if P-type FET devices are used instead, the polarity of the bypass switch gate driver signal $GATE_{BP}$ 220 and the laser diode switch gate driver signal $GATE_{DL}$ 221 are inverted.

Upon receiving (e.g., from the timing and control circuit 120) an asserted level of the bypass switch gate driver signal $GATE_{BP}$ 220 at the gate node of the bypass switch $M_{BP}$, the bypass switch $M_{BP}$ is enabled (i.e., transitioned to an ON-state). Similarly, upon receiving (e.g., from the timing and control circuit 120) an asserted level of the laser diode switch gate driver signal $GATE_{DL}$ 221 at the gate node of the laser diode switch $M_{DL}$, the laser diode switch $M_{DL}$ is enabled. As highlighted in the plot 202, when the bypass switch $M_{BP}$ is enabled, the rising current $i_{LS}$ 222 begins to flow through the inductor $L_S$, thereby building magnetic flux at the inductor $L_S$. When the current $i_{LS}$ 222 has reached a desired level (e.g., as determined by the timing and control circuit 120 as disclosed herein), a de-asserted level of the bypass switch gate driver signal GATE BP 220 is received (e.g., from the timing and control circuit 120) at the gate node of the bypass switch $M_{BP}$, thereby disabling the bypass switch $M_{BP}$ (i.e., transitioned to an OFF-state). As highlighted in the plot 203, when the bypass switch $M_{BP}$ is disabled, the current $i_{LS}$ 222 which has built up through the inductor $L_S$, having no other current path, is redirected through the laser diode $D_L$, causing a short (e.g., 1 ns-5 ns) high-current pulse (e.g., >30 A) to flow through the laser diode $D_L$, thereby causing the laser diode D L to emit a pulse of laser light.

Because energy in the form of magnetic flux has been stored at the inductor $L_S$, the high-current pulse $i_{DL}$ that flows through the laser diode $D_L$ can be significantly greater than the current $i_{LS}$ that flows through the inductor $L_S$. Values of the reactive components of the laser diode drivers disclosed herein can be advantageously selected to generate a desired current amplitude of the high-current pulse $i_{DL}$.

After emission from the laser diode $D_L$, the bypass switch $M_{BP}$ is reenabled by an asserted level of the bypass switch gate driver signal $GATE_{BP}$ 220, and the laser diode switch $M_{DL}$ is maintained in an enabled state by an asserted level of the laser diode switch gate driver signal $GATE_{DL}$ 221. As highlighted in the plot 204, the bypass switch $M_{BP}$ and the laser diode switch $M_{DL}$ are both advantageously maintained in the enabled state as the source voltage $V_S$ 224 stored at the source capacitor $C_S$ is discharged. As highlighted in the plot 205, while the bypass switch $M_{BP}$ and the laser diode switch $M_{DL}$ are maintained in the enabled state, the current $i_{DL}$ 223 through the laser diode $D_L$ (and importantly, through the parasitic inductance $L_{DL}$ of the laser diode D L) diminishes to zero. Thereafter, both the bypass switch $M_{BP}$ and the laser diode switch $M_{DL}$ are disabled by de-asserted levels (e.g., from the timing and control circuit 120) of the bypass switch gate driver signal $GATE_{BP}$ 220 and the laser diode switch gate driver signal $GATE_{DL}$ 221. Because the laser diode switch $M_{DL}$ is not disabled until a current through the parasitic inductance $L_{DL}$ of the laser diode $D_L$ has diminished to zero, a high voltage spike advantageously does not develop at the anode of the laser diode $D_L$ as there is no rapid change in current through the parasitic inductance $L_{DL}$. Because such high voltage spikes are advantageously mitigated, the laser diode switch $M_{DL}$ does not need to be selected to withstand high voltages, thereby simplifying the design and reducing the cost of the pulsed laser diode drivers disclosed herein as compared to conventional solutions. Additionally, because such high voltage spikes are mitigated, the pulsed laser diode drivers disclosed herein do not require voltage snubbing circuits that are commonly used in conventional solutions, thereby further simplifying the design and reducing the cost of the pulsed laser diode drivers disclosed herein as compared to conventional solutions.

The high-current pulse 223 is a first and largest peak of the resonant waveform developed by reactive components of the pulsed laser diode driver circuit. These reactive components include the source capacitor $C_S$, the inductor $L_S$, the parasitic inductance $L_{DL}$ of the laser diode $D_L$, and the bypass capacitor $C_{BP}$. In addition to the advantages described above, the bypass switch $M_{BP}$ also reduces subsequent resonant waveform "ringing" of the resonant waveform after the high-current pulse 223 is generated. As shown in the plot 206, if a bypass switch gate driver signal $GATE_{BP}$ 220' is not asserted after a high-current pulse $i_{DL}$ 223' is generated, ringing occurs on the current $i_{LS}$ 222' through the inductor $L_S$, on the current $i_{DL}$ 223' through the laser diode $D_L$, and on the source voltage $V_S$ 224' at the source capacitor $C_S$. As shown, the high-current pulse 223' through the laser diode $D_L$ corresponds to a peak (e.g., maximum, or local maximum, amplitude) current of a resonant waveform of current $i_{DL}$ 223' developed at the anode of the laser diode $D_L$.

As described above, values of the source capacitor $C_S$, the inductor $L_S$ and the bypass capacitor $C_{BP}$ may be advantageously selected or "tuned" by a designer or end-user to meet desired performance criteria of the pulsed laser diode driver disclosed herein. For example, a capacitance value of the bypass capacitor $C_{BP}$ may be selected based on a desired pulse width of the current $i_{DL}$ through the laser diode $D_L$. The plot 207 shows the high-current pulse 223 generated when the capacitance of the bypass capacitor $C_{BP}$ is equal to 1 nF, and a pulse 223" generated when the capacitance of the bypass capacitor $C_{BP}$ is equal to 4 nF. In use cases where a wider pulse, such as the pulse 223", is desired, the source voltage $V_S$ may be raised accordingly. Additionally, in some embodiments, the width of the de-asserted portion of the bypass switch gate driver signal $GATE_{BP}$ 220 is widened to accommodate a wider pulse.

FIG. 3 illustrates a portion of an example switching sequence 300 for operation of the pulsed laser diode driver 101 shown in FIG. 1, in accordance with some embodiments, and as was described with reference to FIGS. 2A-C. However, the switching sequence 300 is similar to, or the same as, respective switching sequences related to the operation of other embodiments of the pulsed laser diode drivers disclosed herein.

At a precharge step 301, the bypass switch $M_{BP}$ and the laser diode switch $M_{DL}$ are off (i.e., not conducting). During the precharge step 301, the source capacitor $C_S$ is charged by the refresh current $i_{Refresh}$ generated by the timing and control circuit 120. At a preflux step 302, the bypass switch $M_{BP}$ and the laser diode switch $M_{DL}$ are transitioned to an ON-state, thereby allowing the current $i_{LS}$ to flow through the inductor $L_S$ to store energy in the form of magnetic flux at the inductor $L_S$. Even though both of the switches ($M_{DL}$, $M_{BP}$) are in an ON-state at the preflux step 302, the bypass path through the bypass switch $M_{BP}$ will carry all of the current $i_{LS}$ because a bandgap voltage of the laser diode $D_L$ needs to be overcome to allow current to flow through the laser diode $D_L$.

In some embodiments, the laser diode switch $M_{DL}$ is transitioned to an ON-state after the bypass switch $M_{BP}$ is transitioned to an ON-state. At a pulse generation step 303, the bypass switch $M_{BP}$ is transitioned to an OFF-state while the laser diode switch $M_{DL}$ is maintained in an ON-state, thereby generating the high-current pulse through the laser diode $D_L$. As disclosed herein, the bypass switch $M_{BP}$ is transitioned to the OFF-state upon a determination by the timing and control circuit 120 that the current $i_{DL}$ through the inductor $L_S$ is at, or is close to, a maximum current amplitude. During the pulse generation step 303, the refresh current i not generated by the timing and fresh is control circuit 120. When the bypass switch $M_{BP}$ is transitioned to the OFF-state, voltage at the anode of the laser diode $D_L$ rises quickly, until the bandgap voltage of the laser diode $D_L$ is overcome and the laser diode $D_L$ begins to conduct current. Because of a resonant circuit formed by the bypass capacitor $C_{BP}$ and the parasitic inductance $L_{DL}$ of the laser diode $D_L$, the voltage formed at the anode of the laser diode $D_L$ will advantageously rise as high as necessary to overcome the bandgap voltage of the laser diode $D_L$ and will generally be higher than the source voltage $V_S$.

At a discharge step 304, the bypass switch $M_{BP}$ and the laser diode switch $M_{DL}$ are maintained in an ON-state to drain charge stored at the source capacitor $C_S$, thereby reducing the current $i_{DL}$ through the parasitic inductance $L_{DL}$ to advantageously eliminate a high voltage spike at the anode of the laser diode $D_L$ when the laser diode switch $M_{DL}$ is transitioned to an OFF-state. During the discharge step 304, the refresh current $i_{Refresh}$ is not generated by the timing and control circuit 120. In embodiments that include the optional discharge switch $M_{DAMP}$ and the alternate optional damping resistor $R'_{Damp}$ that is shown in FIG. 1, the discharge switch $M_{DAMP}$ is enabled via the discharge switch gate driver signal $GATE_{DAMP}$ during the discharge step 304 to rapidly discharge the source capacitor $C_S$. The discharge switch $M_{DAMP}$ is disabled during steps 301, 302, 303, and 305.

At step 305, the bypass switch $M_{BP}$ and the laser diode switch $M_{DL}$ are transitioned to an OFF-state, thereby returning to the precharge state at step 301. Because the source voltage $V_S$ at the source capacitor $C_S$ is completely discharged at the end of the discharge step 304, there is very little current through the laser diode $D_L$. Thus, there is advantageously very little overshoot when the switches $M_{DL}$, and $M_{BP}$ are transitioned to the OFF-state at step 305, thereby preventing damage to the laser diode D L and the switches $M_{DL}$, and $M_{BP}$. The time interval of the overall pulse and bypass signals is selected, in some embodiments, such that the source capacitor $C_S$ is fully discharged before the switches $M_{DL}$, and $M_{BP}$ are transitioned to the OFF-state at step 305.

Other topologies of pulsed laser drivers, having the same or similar advantages and having similar operation as that of the pulsed laser diode driver 101, are disclosed below. The example topologies disclosed herein are not an exhaustive list of possible topologies that have the same or similar advantages and similar operation as that of the pulsed laser diode driver 101. For example, one of skill in the art will appreciate that some modifications can be made while still adhering to the general principle of operation disclosed herein. Such modifications include placement of the bypass capacitor $C_{BP}$, component values, and the addition of serially connected components that provide a DC current path.

Figure 4:
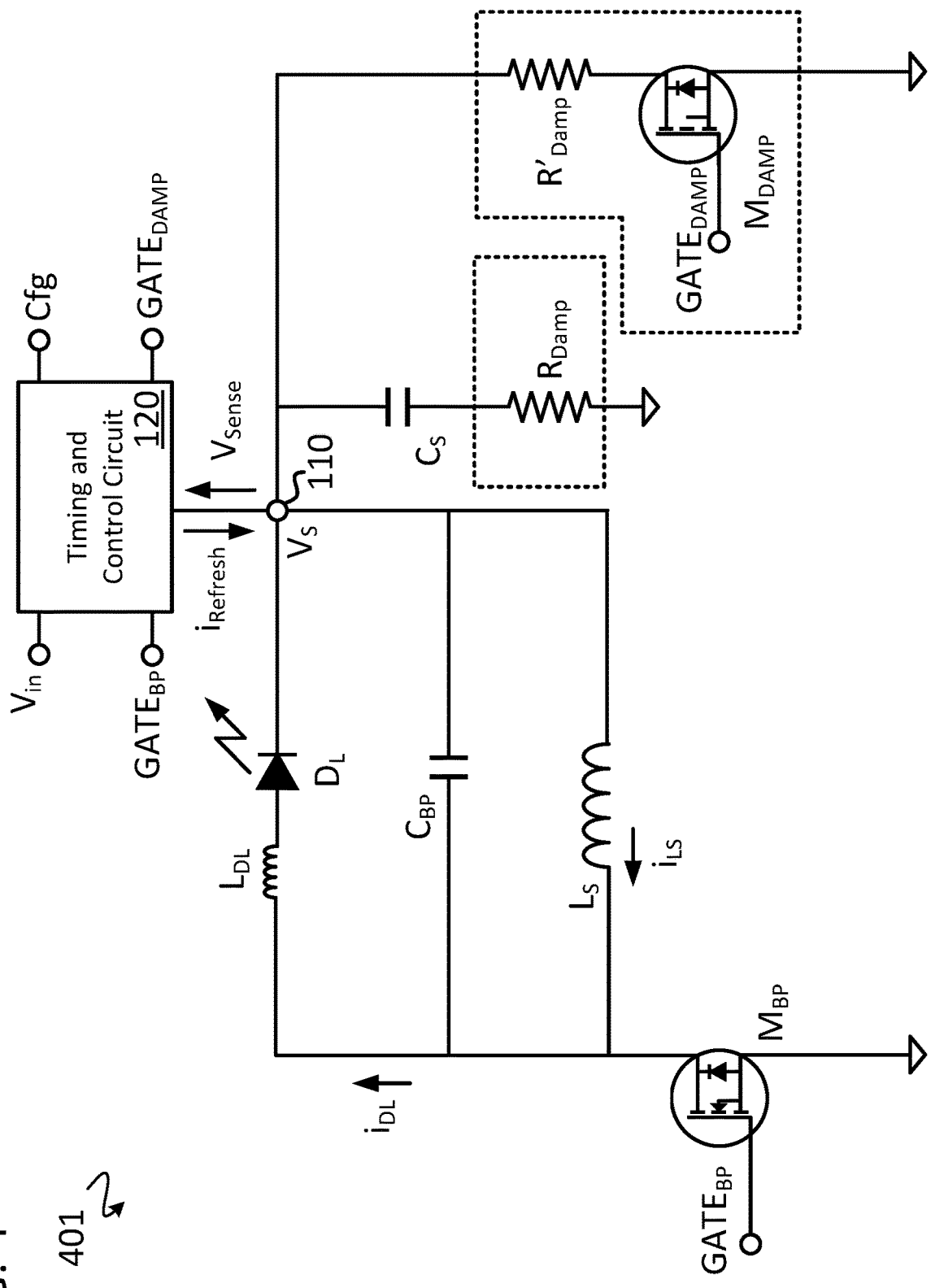
FIG. 4 shows a simplified circuit schematic of a pulsed laser diode driver of a second general topology with adaptive switch timing, in accordance with some embodiments.

FIG. 4 shows a simplified circuit schematic of a pulsed laser diode driver 401 of a second general topology, in accordance with some embodiments. The pulsed laser diode driver 401 generally includes the timing and control circuit 120, the source capacitor $C_S$, the optional damping resistor R Damp, the alternate optional damping resistor R'D am p, the inductor $L_S$, the bypass capacitor $C_{BP}$, the laser diode $D_L$, the bypass switch $M_{BP}$, and the discharge switch $M_{DAMP}$ described with reference to FIG. 1. The discharge switch $M_{DAMP}$ is configured as a low-side switch. Also shown is the refresh current $i_{Refresh}$, the node 110, the parasitic inductance $L_{DL}$ of the laser diode $D_L$, the DC input voltage $V_{in}$, the source voltage $V_s$ at the source capacitor $C_S$, the current $i_{LS}$ through the inductor $L_S$, the current $i_{DL}$ through the laser diode $D_L$, the bypass switch gate driver signal $GATE_{BP}$, and the discharge switch gate driver signal $GATE_{DAMP}$.

As shown in FIG. 4, a first terminal of the source capacitor $C_S$ is configured to receive the refresh current $i_{Refresh}$ from the timing and control circuit 120. The first terminal of the source capacitor $C_S$ is directly electrically connected to a cathode of the laser diode $D_L$, a first terminal of the bypass capacitor $C_{BP}$, a first terminal of the inductor $L_S$, and a first terminal of the alternate optional damping resistor $R'_{Damp}$. A second terminal of the source capacitor $C_S$ is directly electrically connected to a bias voltage node such as ground, or is electrically coupled to a bias voltage node such as ground through an optional damping resistor $R_{Damp}$. A second terminal of the alternate optional damping resistor $R'_{Damp}$ is directly electrically connected to a first terminal of the discharge switch $M_{DAMP}$. A second terminal of the optional damping resistor R Damp and a second terminal of the discharge switch $M_{DAMP}$ are directly electrically connected to a bias voltage node such as ground. An anode of the laser diode $D_L$ is directly electrically connected to a second terminal of the bypass capacitor $C_{BP}$, a second terminal of the inductor $L_S$, and to a drain node of the bypass switch $M_{BP}$. A source node of the bypass switch $M_{BP}$ is directly electrically connected to a bias voltage node such as ground.

The bypass switch $M_{BP}$ is configured to receive the bypass switch gate driver signal $GATE_{BP}$ at a gate node (e.g., from the timing and control circuit 120), the bypass switch gate driver signal $GATE_{BP}$ being operable to turn the bypass switch $M_{BP}$ on or off based on a voltage level of the bypass switch gate driver signal GATE BP. Similarly, the discharge switch $M_{DAMP}$ is configured to receive the discharge switch gate driver signal GATE DAMP at a gate node (e.g., from the timing and control circuit 120), the discharge switch gate driver signal $GATE_{DAMP}$ being operable to turn the discharge switch $M_{DAMP}$ on or off based on a voltage level of the discharge switch gate driver signal $GATE_{DAMP}$. Either or both of the bypass switch $M_{BP}$ and/or the discharge switch $M_{DAMP}$ can be implemented as N-type switches or P-type switches. In some embodiments, the bypass switch $M_{BP}$ and/or the discharge switch $M_{DAMP}$ are implemented as Silicon-based or Silicon-Carbide-based field-effect transistors (FETs).

In some embodiments, the pulsed laser diode driver 401 is configured to receive the DC input voltage V in having a voltage range from about 10 V to 20 V, which is advantageously lower than an input voltage used by many conventional pulsed laser diode drivers. The inductor $L_S$ is a physical component added to the pulsed laser diode driver 401 (i.e., as opposed to a representation of a parasitic inductance caused by components or interconnections such as bond wires). Similarly, the bypass capacitor $C_{BP}$ is a physical component added to the pulsed laser diode driver 401 (i.e., as opposed to a representation of a parasitic capacitance). One advantage of using physical inductor and capacitor components rather than using parasitic inductances and capacitances is that values of the inductor $L_S$ and the bypass capacitor $C_{BP}$ can be easily modified by a designer or even an end-user. By comparison, conventional designs that rely on parasitic reactances may require re-design and/or re-layout to change an operating parameter.

As disclosed herein, values of the DC input voltage $V_{in}$, the inductance of the inductor $L_S$, the capacitance of the source capacitor $C_S$, the resistance of the optional damping resistor $R_{Damp}$, and the capacitance of the bypass capacitor $C_{BP}$ can advantageously be selected ("tuned") to achieve a desired operation of the pulsed laser diode driver 401 (e.g., a charge time, a pulse width, a pulse voltage, a pulse current). For example, a pulse width of the current $i_{DL}$ flowing through the laser diode $D_L$ can be tuned by adjusting the capacitance value of the bypass capacitor $C_{BP}$. A peak current level of the pulse of current $i_{DL}$ flowing through the laser diode $D_L$ can be tuned by adjusting the source voltage $V_S$ on the source capacitor $C_S$. A capacitance value of the source capacitor $C_S$ can be tuned to adjust a timing delay of the high-current pulse and an upper range of the current $i_{DL}$ through the laser diode $D_L$. Resistance values of the damping resistor $R_{Damp}$ are dependent on the capacitance value of the source capacitor $C_S$ and can be tuned within a range of values such that at a lower resistance, a lower frequency resonance of the pulsed laser diode drivers disclosed herein is underdamped (e.g., at about $R_{Damp}$=0.1 Ohm), or is critically damped (e.g., at about $R_{Damp}$=0.4 Ohm). The damping resistor $R_{Damp}$ is operable to prevent current of the generated resonant waveform from becoming negative which could thereby enable a body diode of the bypass switch $M_{BP}$. Although a resulting maximum current level of the current $i_{DL}$ through the laser diode $D_L$ is lower for the critically damped case, the current level can be easily adjusted by raising the voltage level of the DC input voltage $V_{in}$.

In some embodiments, the DC input voltage $V_{in}$ is about 15 V, the inductance of the inductor $L_S$ is about 6 nH, the capacitance of the source capacitor $C_S$ is about 100 nF, the resistance of the damping resistor $R_{Damp}$ is about 0.1 Ohm, and the capacitance of the bypass capacitor $C_{BP}$ is about 1 nF. In some embodiments, a voltage at the first terminal of the damping resistor $R_{Damp}$ is received by the timing and control circuit 120 to provide an indication of a current flow through the damping resistor $R_{Damp}$.

During operation, the source capacitor $C_S$ is discharged through the inductor $L_S$ by the bypass switch $M_{BP}$. This configuration provides a maximum peak current through the laser diode $D_L$ but requires the series damping resistor $R_{Damp}$ to prevent the waveform from ringing for a long duration. Until the ringing stops and the voltage and current are zero, the bypass switch $M_{BP}$ cannot be turned off. Unfortunately, the damping resistor $R_{Damp}$ dissipates power as long as current flows through the damping resistor $R_{Damp}$. Thus, in some embodiments, the damping resistor $R_{Damp}$ is zero-ohms, or is a shorted connection, and the discharge switch $M_{DAMP}$ rapidly discharges the source capacitor $C_S$ through the alternate optional damping resistor $R'_{Damp}$ after pulse emission to prevent ringing.

Figure 5:
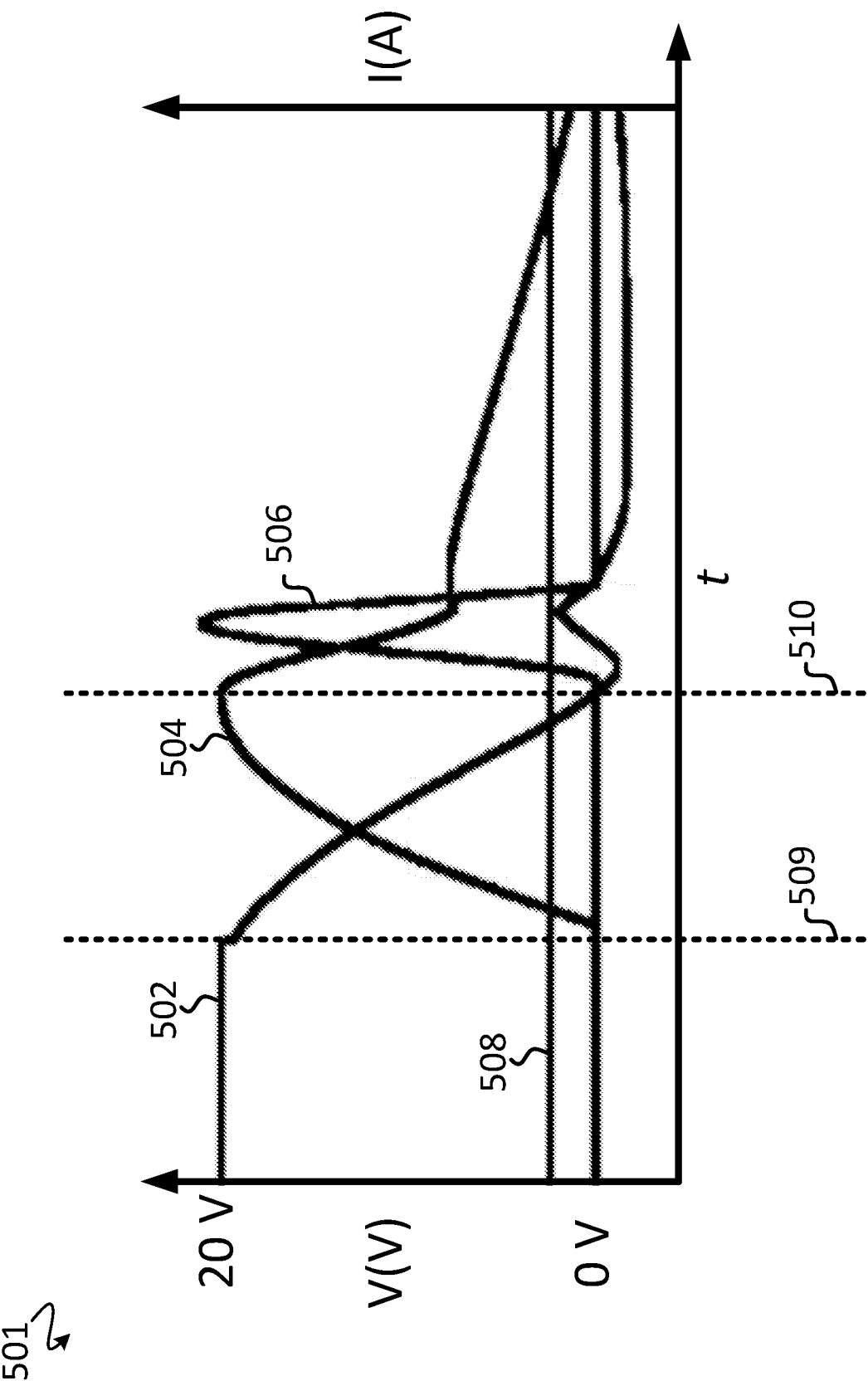
FIG. 5 shows simplified plots of signals related to operation of the pulsed laser diode driver shown in FIG. 4, in accordance with some embodiments.

Additionally, although it would initially appear that placing the source capacitor $C_S$ in series with the laser diode $D_L$ would raise the required anode voltage to pulse the laser diode $D_L$, the voltage and current of the source capacitor $C_S$ are 90-degrees out of phase with one another. Because the current pulse through the laser diode $D_L$ is advantageously aligned with a peak current amplitude, voltage at the source capacitor $C_S$ at that time is zero due to the 90-degree phase shift. In some embodiments, a beginning of the high-current pulse could be determined by sensing when the source voltage $V_S$ at the source capacitor $C_S$ is at zero, at which point the high-current pulse through the laser diode $D_L$ should begin. For example, FIG. 5 shows a simplified plot 501 of signals related to operation of the pulsed laser diode driver 101 or 401 describe above, in accordance with some embodiments. The simplified plot 501 illustrates a current plot of the current $i_{LS}$ through the inductor $L_S$ 504, a current plot of the current $i_{DL}$ through the laser diode $D_L$ 506, a voltage plot of the source voltage $V_S$ 502 at the source capacitor $C_S$, a threshold voltage 508 (Vthresh, described below), a first point in time of interest 509, and a second point in time of interest 510, all over the same duration of time t. As shown, a peak amplitude of the current $i_{LS}$ through the inductor $L_S$ 504 occurs concurrently with a voltage level of the source voltage $V_S$ 502 crossing through zero volts at time 510.

To elaborate, when the bypass switch $M_{BP}$ is enabled at the first time of interest 509, energy stored at the source capacitor $C_S$ begins to discharge through the inductor $L_S$. Thus, the current $i_{LS}$ through the inductor $L_S$ 504 increases as the source voltage $V_S$ 502 at the source capacitor $C_S$ falls. At time 510, the amplitude of the current $i_{LS}$ through the inductor $L_S$ 504 is at or near a maximum and a damped harmonic sinusoid of the source voltage $V_S$ 502 occurs at the source capacitor $C_S$ (i.e., at node 110). As a peak amplitude of the current $i_{LS}$ 504 occurs, the damped harmonic sinusoid of the source voltage $V_S$ 502 is close to zero volts or passes below zero volts. Therefore, an optimal time to turn off the bypass switch $M_{BP}$ to allow the flux current $i_{LS}$ 504 to be redirected through the laser diode $D_L$ to form the high current pulse $i_{DL}$ 506 is when the source voltage $V_S$ 502 at the source capacitor $C_S$ is close to or crosses through zero volts.

Figure 6:
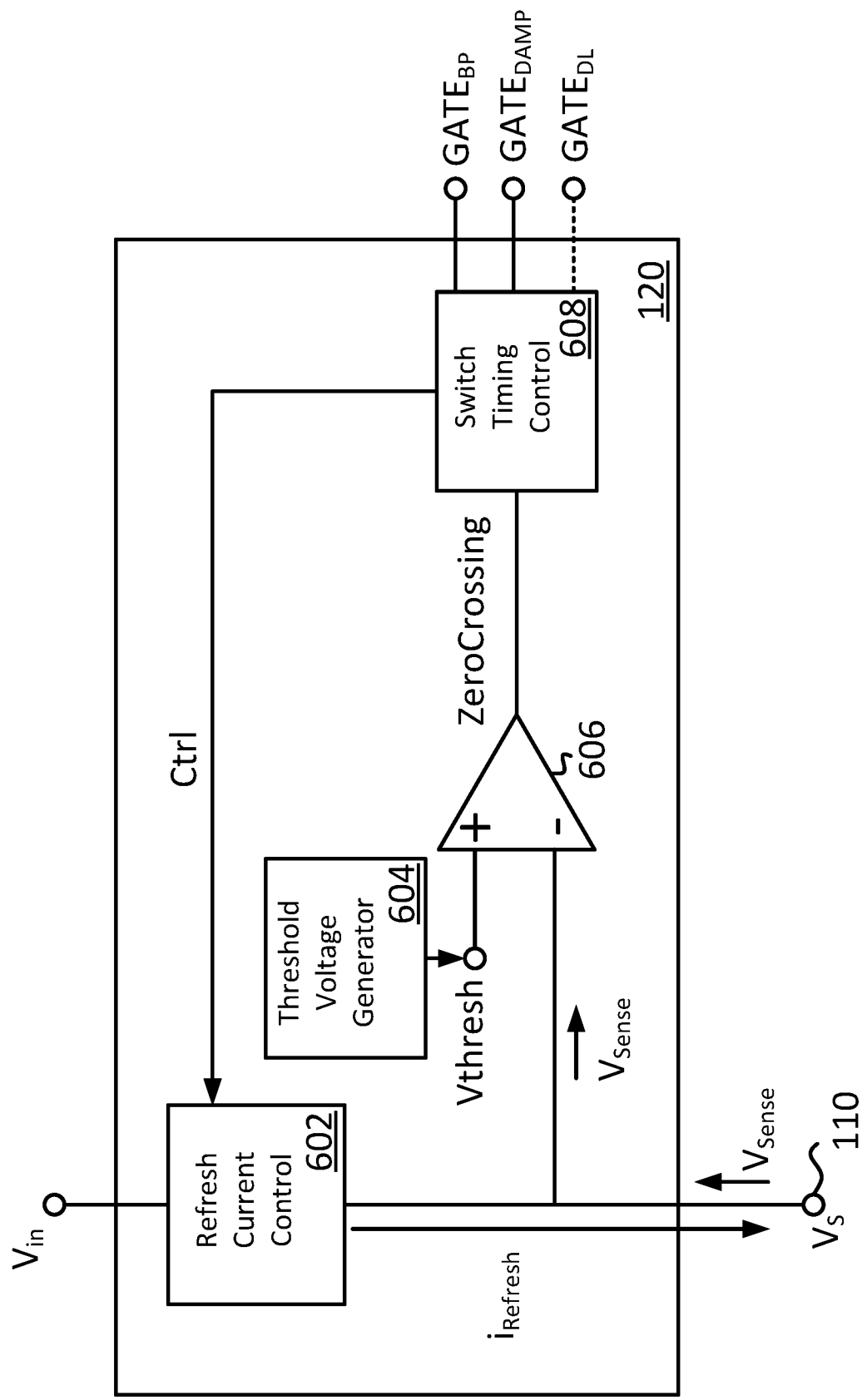
FIG. 6 shows a simplified circuit schematic of a timing and control circuit shown in FIG. 4, in accordance with some embodiments.

FIG. 6 shows a simplified circuit schematic of the timing and control circuit 120 shown in FIG. 1 and FIG. 4, in accordance with some embodiments. As shown, the timing and control circuit 120 generally includes a refresh current control circuit 602, a threshold voltage generator circuit 604, a voltage comparison circuit 606, and a switch timing control circuit 608, coupled as shown. Also shown are the refresh current $i_{Refresh}$, the voltage sense signal $V_{sense}$, a control signal Ctrl, a zero-crossing detection signal ZeroCrossing, the bypass switch gate driver signal $GATE_{BP}$, the discharge switch gate driver signal $GATE_{DAMP}$, the laser diode switch gate driver signal $GATE_{DL}$, and the DC input voltage $V_{in}$.

As described above, the timing and control circuit 120 is operable to synchronize switch timings of the pulsed laser diode drivers disclosed herein such that a flux current its developed through the inductor $L_S$ is directed through the laser diode D L by disabling the bypass switch $M_{BP}$ when a peak amplitude of the flux current $i_{LS}$ is at a maximum. However, although the peak amplitude of the flux current $i_{LS}$ through the inductor $L_S$ occurs as the voltage $V_S$ at the source capacitor $C_S$ is about zero volts, comparator circuits typically work better with inputs that are greater than zero volts as they generally run on a single low voltage supply (e.g., 3-5 V). Thus, in some embodiments, a threshold voltage of Vthresh (e.g., the threshold voltage 508 shown in FIG. 5) is selected to be a voltage that is greater than 0 volts. For example, in some embodiments, the threshold voltage Vthresh is less than 2 volts. In other embodiments, the threshold voltage Vthresh is less than 1 volt. In yet other embodiments, the threshold voltage Vthresh is less than a percentage of the source voltage $V_{in}$ (e.g., 1%, 2%, 3%, or another suitable value).

The voltage comparison circuit 606 receives the threshold voltage Vthresh from the threshold voltage generator circuit 604 and receives the sense voltage $V_{sense}$ from node 110 node at the source capacitor $C_S$. The sense voltage $V_{sense}$ is or is representative of the source voltage $V_S$ developed at the source capacitor $C_S$. The voltage comparison circuit 606 compares a voltage amplitude of the threshold voltage Vthresh to a voltage amplitude of the sense voltage $V_{sense}$ and outputs a corresponding level of the ZeroCrossing signal. In the example shown, if the sense voltage $V_{Sense}$ is greater than or equal to the threshold voltage Vthresh, the voltage comparison circuit 606 outputs a de-asserted level of the ZeroCrossing signal. If the sense voltage $V_{Sense}$ is less than the threshold voltage Vthresh, the voltage comparison circuit 606 outputs an asserted level of the ZeroCrossing signal. However, in other embodiments, the output level of the voltage comparison circuit 606 may be inverted. In some embodiments, the threshold voltage generator circuit 604 includes a bandgap voltage reference circuit (not shown) to generate the threshold voltage Vthresh. A bandgap voltage reference circuit is a temperature-independent reference voltage circuit that produces a fixed voltage regardless of power supply variations, temperature changes, or circuit loading from the device. In some embodiments, the bandgap voltage reference circuit of the threshold voltage generator circuit 604 generates the threshold voltage Vthresh having an amplitude of about 1.2 V.

Upon receiving an asserted level of the ZeroCrossing signal, the switch timing control circuit 608 briefly disables the bypass switch $M_{BP}$ (e.g., for a 1-3 ns pulse) using the bypass switch gate driver signal $GATE_{BP}$ as described with reference to step 303 of FIG. 3. In embodiments of the pulsed laser diode drivers 101/401 disclosed herein that include a laser diode switch $M_{DL}$ and/or a discharge switch $M_{DAMP}$, the switch timing control circuit 608 is additionally operable to generate gate driver signals $GATE_{DL}$ and $GATE_{DAMP}$ to control the laser diode switch $M_{DL}$ and/or the discharge switch $M_{DAMP}$, respectively (e.g., in accordance with steps 301 through 305 described with reference to FIG. 3).

In some embodiments, the switch timing control circuit 608 includes a latch circuit (not shown) to ensure that only the correct portion of the laser diode switching cycle is considered and thus that only one pulse from the voltage comparison circuit 606 is used for each switching cycle. For example, with reference to FIG. 5, the latch circuit ensures that when the source voltage $V_S$ 502 transitions to a voltage level that is less than the threshold voltage 508 at the time of interest 510, a pulse emitted by the voltage comparison circuit 606 is considered by the switch timing control circuit 608, but subsequent ringing of the source voltage $V_S$ 502 after the time of interest 510 and within the same switching cycle is ignored by the switch timing control circuit 608.

Because the threshold voltage of Vthresh is greater than zero volts, the voltage comparison circuit 606 correspondingly outputs an asserted level of the ZeroCrossing signal when the voltage $V_S$ is still greater than zero volts. However, due to switch propagation timing of the timing and control circuit 120 and the bypass switch $M_{BP}$, the bypass switch $M_{BP}$ will change states at a point when an amplitude of the voltage $V_S$ at the source capacitor is even lower than the threshold voltage Vthresh because the voltage $V_S$ at the source capacitor $C_S$ is continuing to fall. As such, the 1-3 ns bypass switch gate driver signal pulse to disable the bypass switch $M_{BP}$ will straddle a peak current of the flux current i L s, thereby providing a greater power efficiency for the pulsed laser diode drivers 101 and 401 as compared to pulsed laser diode driver circuits that do not use flux current timing methods as disclosed herein.

FIG. 7 is a simplified plot 701 of voltage amplitude signals 702a-e of the voltage at the anode of the laser diode $D_L$, current amplitude signals 704a-e of the current $i_{DL}$ through the laser diode $D_L$, bypass switch gate driver signals (GATE BP) 706a-e, and pulses 708a-e of the respective bypass switch gate driver signals (GATE BP) 706a-e. Each grouping of signals {702a, 704a, 706a, 708a}, {702b, 704b, 706b, 708b}, {702c, 704c, 706c, 708c}, {702d, 704d, 706d, 708d}, and {702e, 704e, 706e, 708e} was produced by a laser diode driver circuit similar to the pulsed laser diode driver 101 or 401 and having a respective different capacitance for the source capacitor $C_S$.

During each of the pulses 708a-e, the bypass switch $M_{BP}$ of the pulsed laser diode driver 101 or 401 is disabled and current $i_{LS}$ is redirected through the laser diode $D_L$ to produce a high-current pulse $i_{DL}$ through the laser diode $D_L$. The signals {702a, 704a, 706a, 708a} were generated using a source capacitor capacitance value of $C_S$=10 nF, the signals {702b, 704b, 706b, 708b} were generated using a source capacitor capacitance value of $C_S$=25 nF, the signals {702c, 704c, 706c, 708c} were generated using a source capacitor capacitance value of $C_S$=50 nF, the signals {702d, 704d, 706d, 708d} were generated using a source capacitor capacitance value of $C_S$=100 nF, and the signals {702e, 704e, 706e, 708e} were generated using a source capacitor capacitance value of $C_S$=200 nF. The inductance of the inductor $L_S$ was 6 nH and the input voltage was 10 V for each example. As shown, the respective position in time of the pulses 708a-e of the bypass switch gate driver signals $GATE_{BP}$ shifts as the capacitance value of the source capacitor $C_S$ changes. Thus, in each example, the 3-4 ns bypass pulse 708a-e is advantageously shifted in time by the timing and control circuit 120 to align with the respective peak current 704a-e through the laser diode $D_L$. In each example, an amplitude of the high-current pulse $i_{DL}$ can be adjusted by increasing or decreasing the applied laser driver voltage $V_S$ on the source capacitor $C_S$.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A pulsed laser diode driver comprising:
    a source capacitor having i) a first terminal configured to receive a refresh current and to develop a source voltage therefrom, and ii) a second terminal electrically coupled to ground;
    an inductor having a first terminal that is directly electrically connected to the first terminal of the source capacitor;
    a laser diode having an anode and a cathode, the anode being directly electrically connected to a second terminal of the inductor;
    a bypass capacitor having a first terminal directly electrically connected to the second terminal of the inductor;
    one or more switches configured to control a current flow through the inductor; and
    a timing and control circuit configured to receive the source voltage and to generate one or more gate driver signals to control the one or more switches to produce a high-current pulse through the laser diode, the high-current pulse corresponding to a peak current of a resonant waveform developed at the anode of the laser diode, a timing of the one or more gate driver signals being based on a voltage level of the source voltage.

2. The pulsed laser diode driver of claim 1, wherein:
the timing and control circuit is configured to generate the one or more gate driver signals to control the one or more switches to produce the high-current pulse through the laser diode when the voltage level of the source voltage is about zero volts.

3. The pulsed laser diode driver of claim 1, wherein:
a second terminal of the bypass capacitor is directly electrically connected to ground.

4. The pulsed laser diode driver of claim 1, wherein:
the one or more switches include a laser diode switch; and
the cathode of the laser diode is directly electrically connected to a drain node of the laser diode switch.

5. The pulsed laser diode driver of claim 1, wherein:
a second terminal of the bypass capacitor and the cathode of the laser diode are both directly electrically connected to the first terminal of the inductor.

6. The pulsed laser diode driver of claim 1, wherein the timing and control circuit comprises:
a voltage comparison circuit to generate a comparison signal based on a comparison between the voltage level of the source voltage and a threshold voltage; and
a switch timing control circuit to receive the comparison signal and to generate the one or more gate driver signals to control the one or more switches to produce the high-current pulse through the laser diode based on a state of the comparison signal.

7. The pulsed laser diode driver of claim 6, wherein:
the threshold voltage is generated by a threshold voltage generator circuit comprising a bandgap voltage reference circuit.

8. The pulsed laser diode driver of claim 7, wherein:
the threshold voltage is about 1.2 volts.

9. The pulsed laser diode driver of claim 6, wherein:
the one or more switches comprise a bypass switch having a drain node that is directly electrically connected to the second terminal of the inductor and a source node that is directly electrically connected to ground;
the one or more gate driver signals comprise a bypass switch gate driver signal to control the bypass switch; and
the switch timing control circuit disables the bypass switch using the bypass switch gate driver signal to produce the high-current pulse through the laser diode upon determining, based on the comparison signal, that the voltage level of the source voltage is less than the threshold voltage.

10. The pulsed laser diode driver of claim 1, wherein:
the one or more switches comprise a discharge switch having a drain node that is electrically coupled to the first terminal of the source capacitor and a source node that is directly electrically connected to ground; and
the one or more gate driver signals comprise a discharge switch gate driver signal to control the discharge switch.

11. A pulsed laser diode driver comprising:
a source capacitor having i) a first terminal configured to receive a refresh current and to develop a source voltage therefrom, and ii) a second terminal electrically coupled to ground;
an inductor having a first terminal that is directly electrically connected to the first terminal of the source capacitor;
a laser diode having an anode and a cathode, the anode being directly electrically connected to a second terminal of the inductor;
a bypass capacitor having a first terminal directly electrically connected to the second terminal of the inductor;
a bypass switch having a drain node that is directly electrically connected to the second terminal of the inductor and a source node that is directly electrically connected to ground, the bypass switch being configured to control a current flow through the inductor; and
a timing and control circuit configured to receive the source voltage, and based on determining that a voltage level of the source voltage is less than a threshold voltage, to disable the bypass switch to produce a high-current pulse through the laser diode, the high-current pulse corresponding to a peak current of a resonant waveform developed at the anode of the laser diode.

12. The pulsed laser diode driver of claim 11, wherein:
a second terminal of the bypass capacitor is directly electrically connected to ground.

13. The pulsed laser diode driver of claim 11, wherein:
the pulsed laser diode driver further comprises a laser diode switch; and
the cathode of the laser diode is directly electrically connected to a drain node of the laser diode switch.

14. The pulsed laser diode driver of claim 11, wherein:
a second terminal of the bypass capacitor and the cathode of the laser diode are both directly electrically connected to the first terminal of the inductor.

15. The pulsed laser diode driver of claim 11, wherein the timing and control circuit comprises:
a voltage comparison circuit to generate a comparison signal based on a comparison between the voltage level of the source voltage and the threshold voltage; and
a switch timing control circuit to receive the comparison signal and to generate one or more gate driver signals to control the bypass switch based on a level of the comparison signal.

16. The pulsed laser diode driver of claim 15, wherein:
the threshold voltage is generated by a threshold voltage generator circuit comprising a bandgap voltage reference circuit.

17. The pulsed laser diode driver of claim 16, wherein:
the threshold voltage is about 1.2 volts.

18. The pulsed laser diode driver of claim 11, wherein:
the pulsed laser diode driver further comprises a discharge switch having a drain node that is electrically coupled to the first terminal of the source capacitor and a source node that is directly electrically connected to ground; and
the timing and control circuit is further configured to generate a discharge switch gate driver signal to control the discharge switch.

* * * * *